United States Patent
Brimijoin, II et al.

(10) Patent No.: US 11,843,926 B2
(45) Date of Patent: *Dec. 12, 2023

(54) AUDIO SYSTEM USING INDIVIDUALIZED SOUND PROFILES

(71) Applicant: META PLATFORMS TECHNOLOGIES, LLC, Menlo Park, CA (US)

(72) Inventors: William Owen Brimijoin, II, Kirkland, WA (US); Nils Thomas Fritiof Lunner, Redmond, WA (US); Philip Robinson, Seattle, WA (US); Ravish Mehra, Tacoma, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,393

(22) Filed: Dec. 21, 2021

(65) Prior Publication Data
US 2022/0116705 A1   Apr. 14, 2022

Related U.S. Application Data

(63) Continuation of application No. 16/945,388, filed on Jul. 31, 2020, now Pat. No. 11,245,984.
(Continued)

(51) Int. Cl.
*H04R 3/04* (2006.01)
*H04R 5/033* (2006.01)
(Continued)

(52) U.S. Cl.
CPC ........... *H04R 3/04* (2013.01); *G02B 27/0172* (2013.01); *G06F 3/013* (2013.01); *G06F 3/017* (2013.01);
(Continued)

(58) Field of Classification Search
CPC . H04R 3/04; H04R 5/033; H04R 5/04; H04R 1/1016; G02B 27/0172;
(Continued)

(56) References Cited

U.S. PATENT DOCUMENTS 10,638,252 B1 * 4/2020 Donley ................ H04R 1/1083
10,812,896 B2   10/2020 Oishi et al.
(Continued)

FOREIGN PATENT DOCUMENTS

CN           110473567 A    11/2019

OTHER PUBLICATIONS

International Search Report and Written Opinion for International Application No. PCT/US2021/036053, dated Nov. 25, 2021, 21 pages.
(Continued)

*Primary Examiner* — Xu Mei
(74) *Attorney, Agent, or Firm* — Fenwick & West LLP

(57) ABSTRACT

A system for presenting audio content to a user. The system comprises one or more microphones coupled to a frame of a headset. The one or more microphones capture sound from a local area. The system further comprises an audio controller integrated into the headset and communicatively coupled to an in-ear device worn by a user. The audio controller identifies one or more sound sources in the local area based on the captured sound. The audio controller further determines a target sound source of the one or more sound sources and determines one or more filters to apply to a sound signal associated with the target sound source in the captured sound. The audio controller further generates an augmented sound signal by applying the one or more filters to the sound signal and provides the augmented sound signal to the in-ear device for presentation to a user.

18 Claims, 6 Drawing Sheets

Related U.S. Application Data

(60) Provisional application No. 63/052,016, filed on Jul. 15, 2020.

(51) Int. Cl.
| | | |
|---|---|---|
| *H04R 5/04* | (2006.01) | |
| *H04R 1/10* | (2006.01) | |
| *H04S 7/00* | (2006.01) | |
| *G06F 3/01* | (2006.01) | |
| *G02B 27/01* | (2006.01) | |
| *G06T 19/00* | (2011.01) | |
| *H04S 1/00* | (2006.01) | |

(52) U.S. Cl.
CPC ......... *G06T 19/006* (2013.01); *H04R 1/1016* (2013.01); *H04R 5/033* (2013.01); *H04R 5/04* (2013.01); *H04S 1/005* (2013.01); *H04S 7/304* (2013.01); *G02B 2027/0178* (2013.01)

(58) Field of Classification Search
CPC .......... G02B 2027/0178; G06T 19/006; G06F 3/013; G06F 3/017; H04S 1/005; H04S 7/304
USPC ................ 381/74, 91, 92, 122, 71.6, 72
See application file for complete search history.

(56) References Cited

U.S. PATENT DOCUMENTS

| | | | |
|---|---|---|---|
| 10,869,120 | B1 | 12/2020 | Jacobs et al. |
| 10,893,357 | B1 | 1/2021 | Oishi et al. |
| 11,134,349 | B1 | 9/2021 | Nagar et al. |
| 11,202,145 | B1 * | 12/2021 | Oishi .................. H04R 1/1075 |
| 11,245,984 | B1 * | 2/2022 | Brimijoin, II ......... H04R 3/005 |
| 2005/0195988 | A1 | 9/2005 | Tashev et al. |
| 2015/0156592 | A1 | 6/2015 | Jensen |
| 2015/0358732 | A1 | 12/2015 | Yu et al. |
| 2016/0080874 | A1 | 3/2016 | Fullam |
| 2016/0313973 | A1 | 10/2016 | Yajima |
| 2019/0238971 | A1 * | 8/2019 | Wakeland .............. H04R 1/347 |
| 2019/0394576 | A1 | 12/2019 | Petersen et al. |

OTHER PUBLICATIONS

Invitation to Pay Additional Fees received for International Application No. PCT/US2021/036053, dated Sep. 30, 2021, 16 pages.

Souza P.E., "Effects of Compression on Speech Acoustics, Intelligibility, and Sound Quality," Trends in Amplification, Dec. 2002, vol. 6 (4), pp. 131-165.

European Search Report for European Patent Application No. 23176819.3, dated Aug. 25, 2023, 08 pages.

* cited by examiner

AUDIO SYSTEM USING INDIVIDUALIZED SOUND PROFILES

CROSS-REFERENCE TO RELATED APPLICATIONS

This application is a continuation of co-pending U.S. patent application Ser. No. 16/945,388, filed Jul. 31, 2020, which claims the benefit of U.S. Provisional Application No. 63/052,016, filed Jul. 15, 2020, all of which are incorporated by reference in their entirety.

FIELD OF THE INVENTION

This disclosure relates generally to generating audio content, and more specifically to an audio system that uses sound profiles that are individualized to respective users.

BACKGROUND

In environments with multiple sound sources, a listener may encounter trouble tuning into a particular sound source while tuning out sound from other sound sources. For example, in a busy room with multiple people speaking at the same time, it can be difficult for a listener to discern the words of a particular speaker over the sounds of the other speakers in the room. This phenomenon is known as the cocktail party problem. The cocktail party problem may pose a more acute problem for people with partial hearing loss. The hearing loss may be attributable to factors such as aging, trauma, and hereditary defects. People with hearing loss would be more severely impacted when there are sound sources that interfere with the sound source of interest to the person.

SUMMARY

An audio system on a headset generates one or more filters to apply to audio content prior to the audio content being presented to a user. The one or more filters may be generated based on a sound profile of the user. The sound profile of the user is personalized sound information about the user describing how well a user hears sounds at different frequencies. And in some cases, the user may have some amount of hearing loss which is captured in their sound profile. In order to compensate for some or all of the user's hearing loss, a sound signal in the audio content emitted by a sound source (i.e., a target sound source) may be enhanced by the one or more filters to create an augmented sound signal. In some embodiments, the headset presents the augmented sound signal to the user (e.g., via a speaker assembly on the headset). In some embodiments, the headset provides the augmented sound signal to one or more in-ear devices that are communicatively coupled to the headset, and the one or more in-ear devices present the augmented sound signal to the user. In some embodiments, the headset provides the one or more filters to one or more in-ear devices and the one or more in-ear devices apply the one or more filters to the sound signal to generate the augmented sound signal, and then present the augmented sound signal to the user.

In some embodiments, the one or more filters may be generated to suppress sound. For example, the one or more filters may be used to suppress audio content from one or more sound sources in the local area (e.g., fans, people who are not the target sound source, etc.). And in some embodiments, the one or more filters may be used to suppress a leakage signal (the augmented sound signal that is leaked out into the local area) from the in-ear devices.

In some embodiments, a method is described for augmenting a sound signal for presentation to a user. The method includes capturing, by one or more microphones (e.g., that are arranged on a headset), sound from a local area. The method further includes identifying one or more sound sources in the local area based on the captured sound. The method further includes determining a target sound source of the one or more sound sources. The method further includes determining one or more filters to apply to a sound signal associated with the target sound source in the captured sound. The method further includes generating an augmented sound signal by applying the one or more filters to the sound signal. The method further includes providing the augmented sound signal to a speaker assembly for presentation to a user. In some embodiments, the speaker assembly is on the headset. In other embodiments, the speaker assembly is on the one or more in-ear devices.

In some embodiments, a system is described that augments a sound signal for presentation to a user. The system comprises one or more microphones coupled to a frame of a headset. The one or more microphones are configured to capture sound from a local area. The system further comprises an audio controller integrated into the headset and communicatively coupled to an in-ear device worn by a user. The audio controller is configured to identify one or more sound sources in the local area based on the captured sound. The audio controller is further configured to determine a target sound source of the one or more sound sources. The audio controller is further configured to determine one or more filters to apply to a sound signal associated with the target sound source in the captured sound. The audio controller is further configured to generate an augmented sound signal by applying the one or more filters to the sound signal. The audio controller is further configured to provide the augmented sound signal to the in-ear device for presentation to a user. Also described are embodiments of non-transitory computer-readable storage mediums configured to store instructions for performing the methods of this disclosure.

Figure 1A:
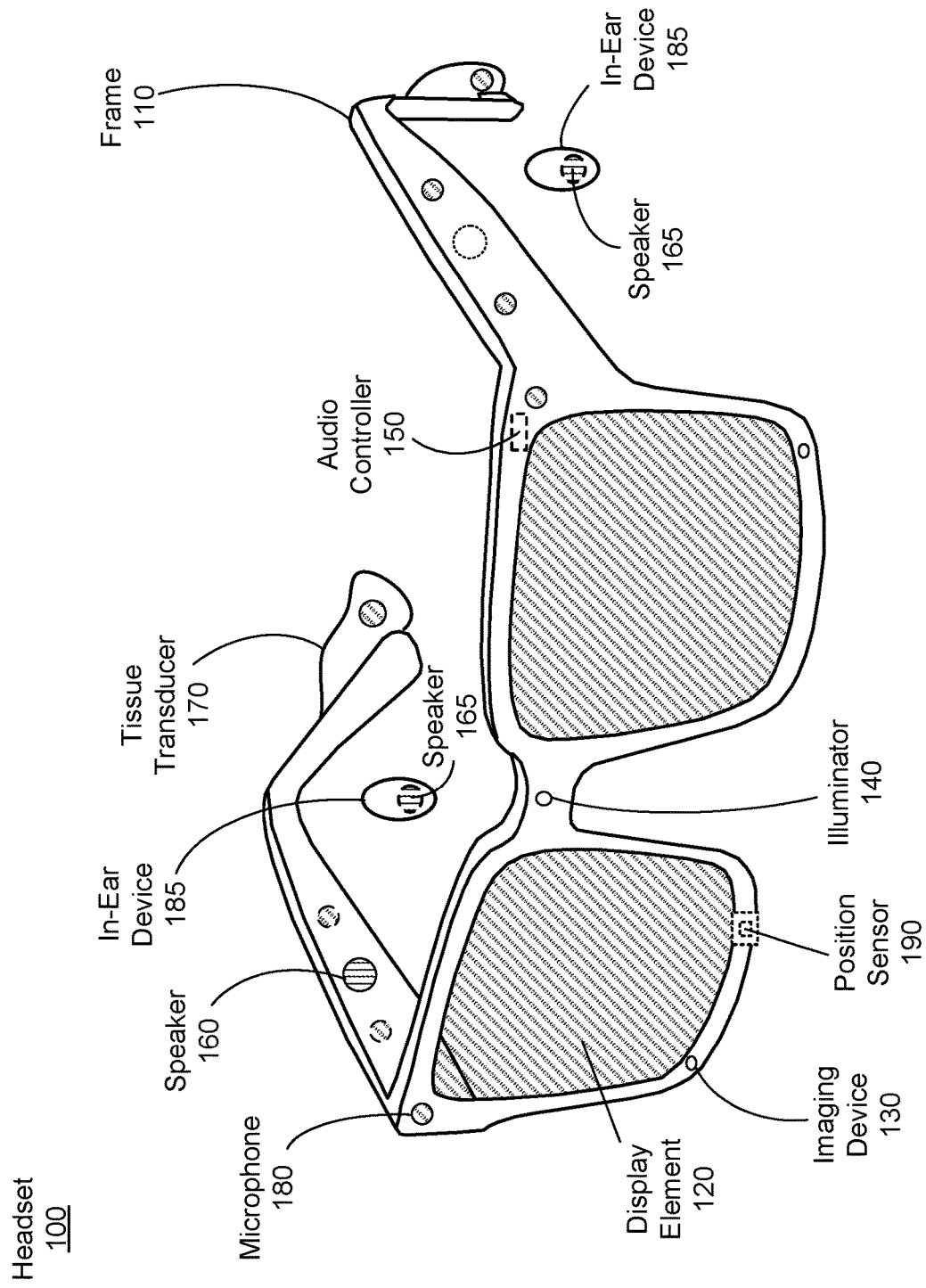
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An audio system on a headset generates one or more filters to apply to audio content prior to the audio content being presented to a user. The audio content may include re-broadcast captured sound from a local area surrounding the headset, virtual sound provided by the headset, music and/or audio (e.g., from a call) provided by a mobile device (e.g., a mobile phone), or some combination thereof. The sound includes one or more sound signals where each sound signal is associated with a sound source. A sound source may be a real-world sound source, such as the user, a person, a person wearing a headset, an animal, a speaker (e.g., a speaker of an in-ear device), a mechanical device, or any other real-world object emitting sound in a local area surrounding the headset, a virtual sound source, such as a virtual object presented to the user in the local area, or a mobile device sound source, such as a mobile phone speaker, a tablet speaker, or any other mobile device speaker emitting sound in the local area. In some embodiments, the audio system generates one or more filters (e.g., low pass, high pass, dynamic range compression filter, etc.) to be applied to a sound signal emitted by a particular sound source (i.e., a target sound source). The one or more filters applied to the sound signal may, e.g., amplify certain frequencies (e.g., frequencies greater than 10 kHz) of the sound signal, apply a specific gain (using a wide dynamic range compression filter) to the sound signal, spatialize the sound signal, attenuate certain frequencies of the sound signal, equalize an intensity of certain frequencies, apply some other adjust to the sound signal, apply a multiband limiter to certain frequencies, or some combination thereof. In some embodiments, the audio system generates one or more filters to be applied to other sound signal(s) emitted by other sound source(s). The one or more filters applied to the other sound signal(s) may decrease or eliminate the particular frequencies of those sound signals. Any or all of the filters may be dynamically adjusted as the audio content changes over time.

The audio system may identify the target sound source based in part on implicit user feedback (e.g., eye tracking information) stored in a model of the local area. The model of the local area tracks the positions, movements, and acoustics for each sound source (including the user) in the local area and stores acoustic parameters that describe the local area. In some embodiments, the audio system may identify the target sound source based on express user input.

The one or more filters generated by the audio system may be based on a sound profile of the user. The sound profile of the user is personalized sound information about the user describing how well a user hears sounds at different frequencies. The sound profile may include audiograms, loudness discomfort level test results, speech-in-noise test results, spectro-temporal discrimination results, temporal fine-structure test results, cognitive performance test results, self-reported hearing abilities, some other hearing test result, or some combination thereof. In some cases, the user may have some amount of hearing loss which is captured in their sound profile. In order to compensate for some or all of the user's hearing loss, the sound signal emitted by the target sound source may be enhanced by one or more filters to create an augmented sound signal. In some embodiments, in order to present a better quality of sound to the user, the sound signal emitted by the target sound source may be augmented to better spatialize the sound signal or may be augmented to reduce feedback. In some embodiments, one or more other sound signals in the audio content emitted by other sound sources may be suppressed by the one or more filters. In some embodiments, the one or more filters generated by the audio system may be based on the model of the local area.

In some embodiments, the audio system may apply the one or more filters to the sound signal emitted by the identified target sound source. In another embodiment, the in-ear devices apply the one or more filters to the sound signal. By applying the filters to the sound signal an augmented sound signal is generated. In some embodiments, the headset presents the augmented sound signal to the user (e.g., via a speaker assembly on the headset). In some embodiments, the headset provides the augmented sound signal to one or more in-ear devices that are communicatively coupled to the headset, and the one or more in-ear devices present the augmented sound signal to the user. In some embodiments, the headset provides the one or more filters to one or more in-ear devices and the one or more in-ear devices apply the one or more filters to the sound signal to generate the augmented sound signal, and then present the augmented sound signal to the user.

Current audio enhancement technologies are unable to solve the cocktail party problem effectively. For example, conventional hearing aids have a very small form factor, as such they do not have room for large multi-microphone arrays. Moreover, the small form factor imposes limitations with regard to processing load and power consumption. With the above in mind, it clear why conventional hearing aids generally do a poor job of isolating and enhancing sound from a sound source in, say a crowded restaurant (i.e., do not really mitigate the cocktail problem). In contrast, the audio system described herein is part of a headset which has a much larger form factor, and can include a much larger microphone array, a larger power source, and more powerful processing capability. As such, it potentially can allow in-ear devices to have a very simple design. The large microphone array allows for a much-improved ability to resolve sound source locations within a local area (relative to conventional hearing aids) in combination with the processing abilities of the audio system are able to greatly mitigate and, in some instances, solve the cocktail party problem. Moreover, the audio system can compensate for hearing loss of the user by using a sound profile of the user to generate audio content for the user.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system of the headset 100. Examples of media content include one or more images, video, audio, or some combination thereof. However, the headset 100 may also be used such that media content is presented to the user in a different manner. For example, audio content may be presented using one or both of the in-ear devices 185 worn by the user. The headset 100 includes a frame 110, and may include, among other components, a display assembly including one or more display elements 120, one or more imaging devices 130, a depth camera assembly (DCA), a position sensor 190, a passive camera assembly (PCA), an eye tracking system, and an audio system. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

Note that in some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

In some embodiments, the headset 100 may include one or more imaging devices 130 that capture visual information for the local area surrounding the headset 100. In some embodiments, the imaging devices 130 are utilized by a depth camera assembly (DCA). The DCA determines depth information for a portion of a local area surrounding the headset 100. The DCA includes the one or more imaging devices 130 and a DCA controller (not shown in FIG. 1A) and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The position sensor 190 generates one or more measurement signals and estimates positional information about the headset 100. The positional information may include a position of the headset 100 in the local area, an orientation of the headset 100, a velocity of the headset 100, or some combination thereof. The positional information of the headset 100 worn by the user corresponds to positional information about the head of the user. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more imaging devices 130

(e.g., RGB cameras) that capture images of some or all of the local area. The images captured by the PCA and the depth information determined by the DCA may be used to determine positional information about the one or more sound sources in the local area (i.e. where each sound source is located within the local area), generate a model of the local area that includes the position of each sound source, update the model of the local area over time (i.e., update the model as one or more sound sources change position), or some combination thereof. Furthermore, the position sensor 190 tracks the position (e.g., location, orientation, and velocity) of the headset 100 in the model of the local area. In some embodiments, the model of the local area is stored in the headset (e.g., in the audio system), in an external system (e.g., a mapping server), in a mobile device, or in any combination thereof.

In some embodiments, the PCA may use an object recognition model to identify a type of sound source for each real-world sound source in the local area. A type of sound source is a classification of the entity emitting sound in the local area. For example, the PCA may use object recognition to identify the type of a real-world sound source. A real-world sound source may be, e.g., a person, a person wearing a headset, a speaker, an animal, a mechanical device, some other real-world entity emitting sound in the local area, or some combination thereof. The PCA may update the model of the local area to include the type of each sound source. The PCA may also update the model of the local area by tracking gestures performed by each person or person wearing a headset. A gesture may include talking, waving, raising a hand, handing a real-world object to the user, or some other gesture performed by the person or person wearing a headset.

In some embodiments, the PCA may capture images of the user. The images captured by the PCA of the user may be used to update the model of the local area with gestures performed by the user. A gesture is any movement performed by the user that is indicative to a command (i.e., an implicit user input). A gesture performed by the user may include, e.g., a pointing gesture with the user's hand(s), finger(s), arm(s), some other movement performed by the user indicative of a command, or some combination thereof.

In some embodiments, the headset 100 may include one or more imaging devices 130 that capture one or more images of the eye(s) of the user wearing the headset 100. In some embodiments, the imaging devices 130 are utilized by an eye tracking system to determine eye tracking information associated with an eye of the user based on the captured images. The eye tracking system may also include one or more light sources (not shown) that illuminate the eye with IR light. A light source may be, e.g., a vertical cavity emitting laser, a light emitting diode (LED), a micro-LED, some other source of infrared light IR, or some combination thereof. The one or more imaging devices 130 utilized by the eye tracking system are configured to capture images of one or both of the eyes illuminated with the IR light from the one or more light sources.

The eye tracking system may determine eye tracking information for one or both of the user's eyes using the captured images and a depth determination technique. Depth determination techniques may include, e.g., structured light, time-of-flight, stereo imaging, some other depth determination methodology familiar to one skilled in the art, etc. In some embodiments, the eye tracking sensor determines eye tracking information based upon the captured images and a model of the user's eye. The eye tracking information determined by the eye tracking system may include, e.g., gaze information, pupillometry information, or some combination thereof. The gaze of the user is a direction the user is looking at (e.g., an eye orientation of the user). The pupillometry information of the user is a pupil size and pupil reactivity. One or both of the gaze information and the pupillometry information may be used to determine where a user is directing their attention (e.g., an implicit user input).

The eye tracking information determined by the eye tracking system may be combined with a determined position of the headset 110 (e.g., as determined using the position sensor 190), to determine the user's gaze. For example, a vector corresponding to the eye orientation of the user (which indicates the orientation of the user's eye relative to their head) can be added to a vector corresponding to the position of the headset (indicating the location and orientation of the headset within the local area) to determine a vector corresponding to the gaze of the user (indicating a direction the user is looking at in the local environment). The model of the local area may include the gaze vector of the user. In some embodiments, the model of the local area may include a history of mapped gave vectors for the user. By determining the gaze of the user, a direction that the user is looking at in the local area is identified, which can, in combination of knowledge of the positions of other sound sources in the local area (e.g., as determined by the audio system), allow for a determination as to which of the sound sources the user is looking towards.

In some embodiments, the eye tracking system may receive one or more images from the PCA depicting the local area within a field of view of the one or more imaging devices 130 utilized by the PCA and maps the determined gaze to a location within the received image. The model of the local area may be updated to include the gaze.

The audio system provides audio content to the user via the headset 100 and/or via the in-ear devices 185. The audio system includes a microphone array, an audio controller 150, and a transducer array. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The microphone array detects sounds within the local area of the headset 100. The microphones 180 capture sounds emitted from one or more real-world sound sources in the local area (e.g., a room). The microphone array includes a plurality of microphones 180. The microphones 180 may be acoustic wave sensors, sound transducers, or similar sensors that are suitable for detecting sounds. The number and/or locations of microphones 180 may be different from what is shown in FIG. 1A. For example, the number of microphone locations may be increased to increase the amount of audio information collected and the sensitivity and/or accuracy of the information. The microphone locations may be oriented such that the microphone 180 is able to detect sounds in a wide range of directions surrounding the user wearing the headset 100. Each microphone 180 is configured to detect sound and convert the detected sound into an electronic format (analog or digital). In some embodiments, the microphones 180 may be placed on an exterior surface of the headset 100, placed on an interior surface of the headset 100, separate from the headset 100 (e.g., part of some other device), or some combination thereof.

In one embodiment, the microphone array captures a leakage signal emitted from the in-ear devices 185. In other embodiments, the microphone array may capture a leakage signal emitted from the transducer array of the audio system of the headset 100. The leakage signal is a sound signal that is in-phase with the augmented sound signal presented as audio content to the user via the in-ear devices 185 or via the audio system of the headset 100. The leakage signal may be heard by other persons or captured by other headset devices in the local area.

The transducer array of the headset 100 may provide one or more sound signals to the user in accordance with instructions from the audio controller 150. For example, the transducer array of the headset 100 may present the augmented sound signal to the user in accordance with instructions from the audio controller. The transducer array includes a plurality of transducers. A transducer may be a speaker 160 or a tissue transducer 170 (e.g., a bone conduction transducer or a cartilage conduction transducer). The number and/or locations of speakers 160 may be different from what is shown in FIG. 1A. For example, the speakers 160 may be enclosed in the frame 110 of the headset 100. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The transducer array may output the mitigation signal in accordance with instructions from the audio controller 150. The mitigation signal substantially cancels out the leakage signal emitted by the in-ear devices 185 in the far field such that other persons or headsets in the local area may not hear or capture the leakage signal in the far field.

The audio controller 150 controls operation of the audio system. The audio controller 150 may comprise a processor and a computer-readable storage medium. The audio controller 150 may identify a sound source (a real-world sound source or a virtual sound source) in the local area as a target sound source. In some embodiments, the audio controller 150 identifies the target sound source based on implicit user input stored in the model of the local area. In some embodiments, the audio controller 150 identifies the target sound source based on express user input (e.g., a verbal cue provided by the user).

The audio controller 150 may generate one or more filters to apply to one or more sound signals captured by the microphone array based on a sound profile of the user. The one or more filters may be applied to, e.g., a sound signal corresponding to sound emitted by the target sound source, a sound signal corresponding to a sound emitted by other sound sources, or some combination thereof. In some embodiments, the audio controller 150 may generate the one or more filters using the model of the local area. In some embodiments, the one or more filters may enhance (e.g., by amplifying certain frequencies, by equalizing the audio, etc.) a sound signal corresponding to sound emitted by the target sound source. In some embodiments, the audio controller 150 generates an augmented signal by applying the one or more filters to the sound signal corresponding to the sound emitted by the target sound source. In some embodiments, the audio controller 150 provides instructions to the in-ear devices 185 to apply the one or more filters to the sound signal to generate the augmented signal.

The audio controller 150 may generate one or more filters that suppress (e.g., by filtering out certain frequencies) sound signal(s) corresponding to sound emitted by other sound source(s) in the local area. In one embodiment, the audio controller 150 determines a mitigation signal. The mitigation signal is a sound signal that is out-of-phase to the leakage signal emitted by the in-ear devices 185. The leakage signal may be heard by other persons and/or captured by other devices (e.g., headsets) in the local area inhibiting the privacy of the user. In some embodiments, the leakage signal may be captured by the microphone array. The audio controller generates a filter that filters out the frequencies of the leakage signal. The audio controller applies this filter to the leakage signal to generate the mitigation signal. The mitigation signal is provided by the audio controller 150 to the transducer array as an output signal. The mitigation signal suppresses the leakage signal in the far field, thus, providing more privacy for the user.

In some embodiments, the audio controller 150 may generate one or more filters that suppress sound signals corresponding to sound emitted by sound sources determined not to be the target sound source. The suppression of sound signals corresponding to sound emitted by other sound sources helps to solve the cocktail party problem. For example, by suppressing frequencies of sound signals associated with the other sound sources (e.g., a plurality of people in a crowd), the audio controller 150 may enhance the sound emitted by the target sound source (e.g., the person the user is in conversation with) without even applying any filter to the sound signal associated with the target sound source. In another example, by suppressing frequencies in the sound signals associated with the other sound sources and enhancing the frequencies in the sound signal associated with the target sound source, the audio controller 150 may solve the cocktail party problem. In some embodiments, the audio controller 150 may determine that frequencies in one or more sound signals associated with one or more other sound sources may be similar to frequencies in the sound signal associated with the target sound source. In this embodiment, the audio controller 150 may determine to not enhance the sound signals associated with the other sound sources and only to enhance the sound signal associated with the target sound source.

In some embodiments, the in-ear devices 185 provide the augmented sound signal to the user in accordance with instructions from the audio controller 150. The in-ear devices 185 may include a communication unit (not shown) and a speaker 165. The in-ear devices 185 are worn by the user (e.g., placed in the respective ear canals of the user) and may present the augmented sound signal to the user via the speakers 165. In some embodiments, the in-ear devices 185 are hearing aids that are communicatively coupled to the headset 100. In some embodiments, the in-ear devices 185 apply the one or more filters to the sound signal to generate the augmented sound signal in accordance with instructions from the audio controller 150. The in-ear devices 185 may then present the augmented sound signal to the user via the speakers 165. While FIG. 1A illustrates an in-ear device 185 for each ear of the user, in other embodiments there may be just a single in-ear device 185 for one ear and no in-ear device for the other ear.

Additional details regarding the audio system are discussed below in FIG. 2 and additional details regarding the components of the headset 100 are discussed below in connection with FIG. 5.

Figure 1B:
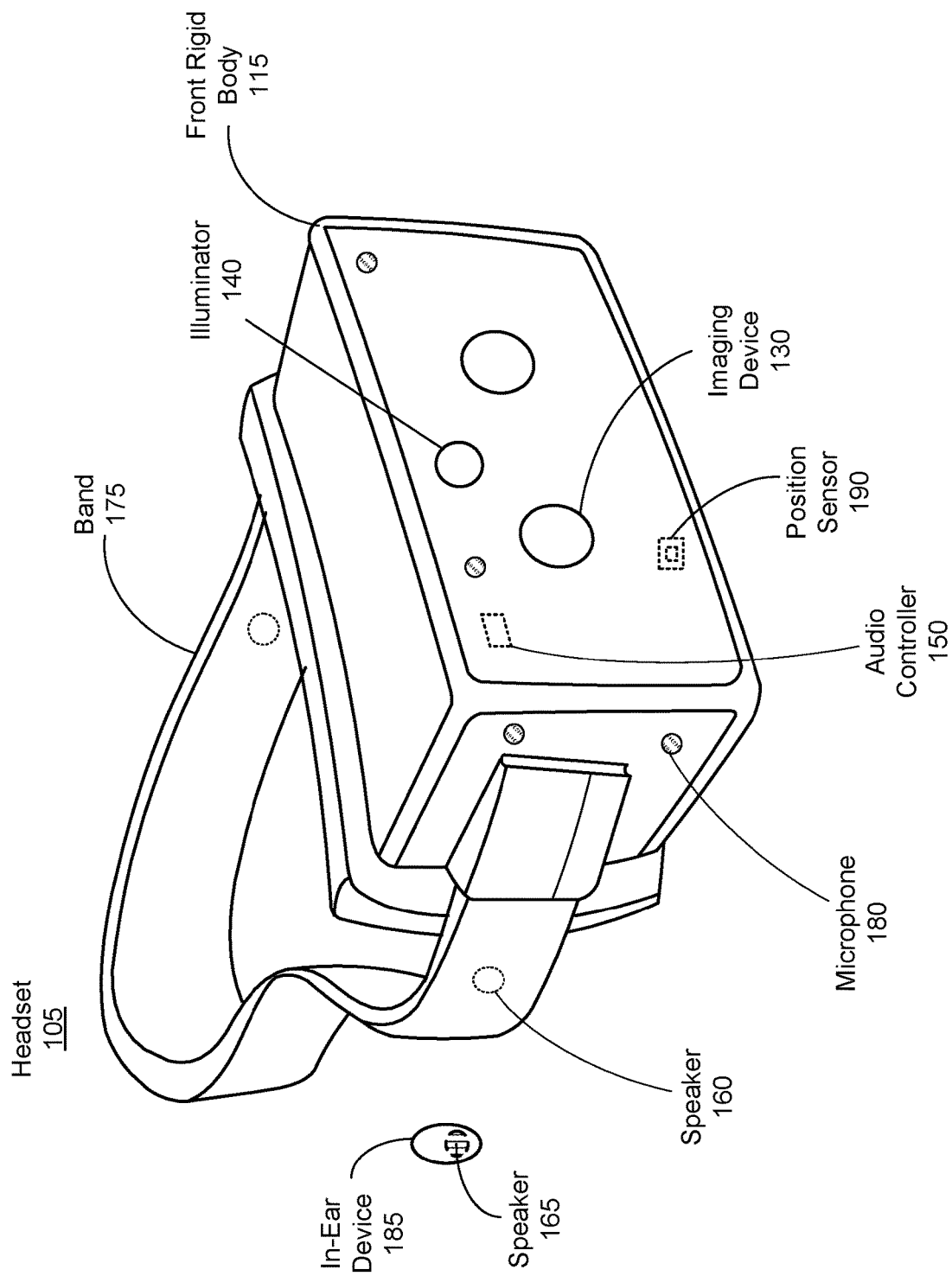
FIG. 1B is a perspective view of a headset implemented as a head-mounted display, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A but modified to integrate with the HMD form factor. For example, the HMD includes one or more imaging devices 130, a depth camera assembly (DCA), a position sensor 190, a passive camera assembly (PCA), an eye tracking system, and an audio system. FIG. 1B shows the illuminator 140, a plurality of the speakers 160, a plurality of microphones 180, and an in-ear device 185 with speaker 165. While FIG. 1B illustrates an in-ear device 185, in other embodiments there may be two in-ear devices 185 one for each ear.

Figure 2:
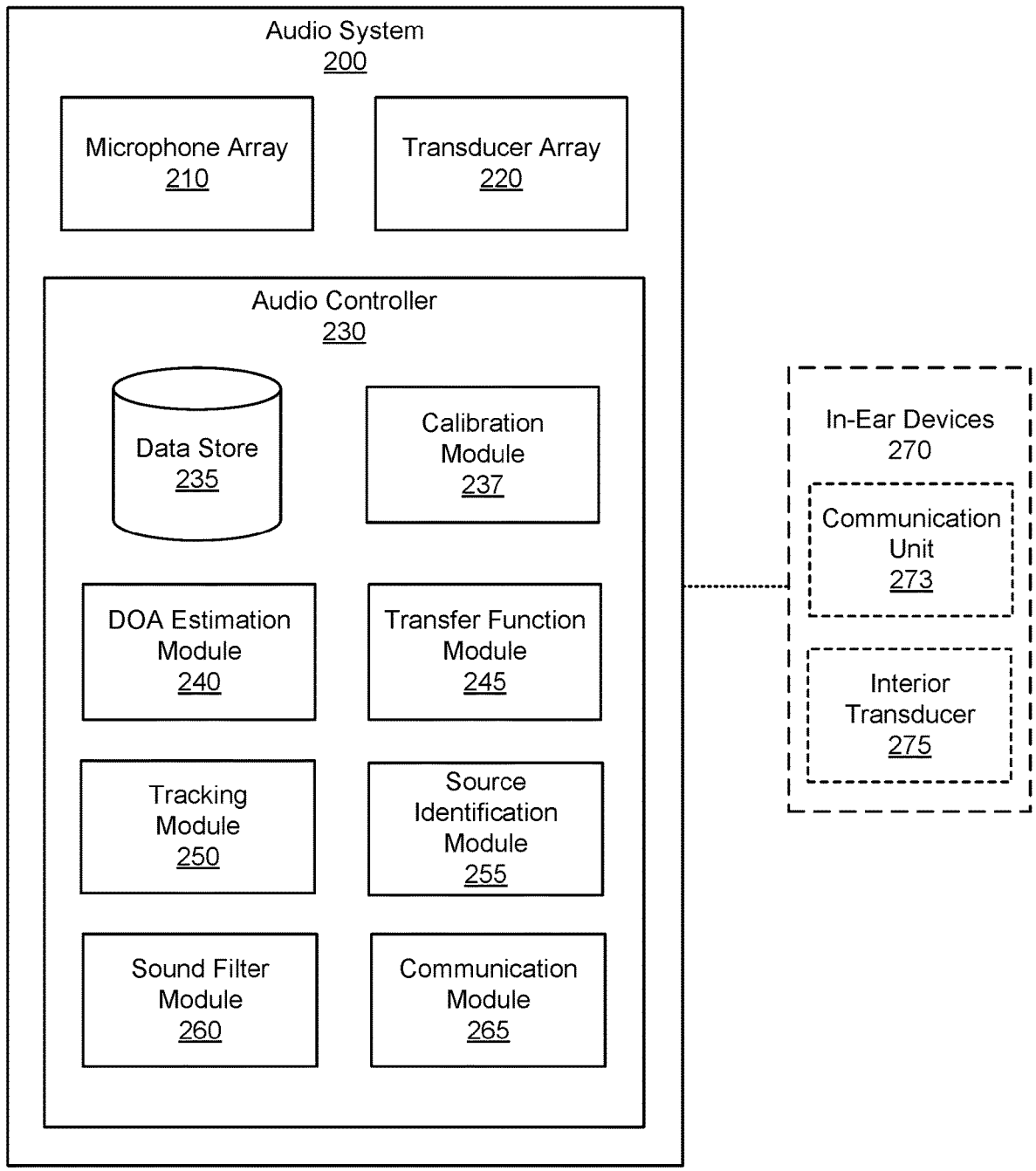
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. In the embodiment of FIG. 2, the audio system 200 includes a microphone array 210, a transducer array 220, and an audio controller 230. In some embodiments, the audio system 200 also includes the in-ear devices 270. Some embodiments of the audio system 200 have different components than those described here. Similarly, in some cases, functions can be distributed among the components in a different manner than is described here. At least a portion of the audio system 200 is integrated into a headset, and in some cases, audio system 200 may also include the in-ear devices 270. Additionally, functionality described in conjunction with one or more of the components shown in FIG. 2 may be distributed amongst one or more external components. For example, some or all of the functionality of the audio controller 230 may be performed by a connected mobile device (e.g., a mobile phone).

The microphone array 210 captures sound within a local area surrounding the microphone array 210. The microphone array 210 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on the in-ear devices 270, some other connected device (e.g., a mobile phone), or some combination thereof. An acoustic sensor may be, e.g., a microphone, a vibration sensor, an accelerometer, or any combination thereof. By increasing the number of acoustic sensors, the accuracy of information (e.g., directionality) describing a sound field produced by any of the sound sources may be improved.

In one embodiment, the microphone array may capture sounds emitted by one or more real-world sound sources within the local area. The captured sounds may include a plurality of sound signals (i.e., a sound signal for each sound source). The sound signals are provided to the audio controller 230 for further processing such as the determination of one or more filters that may enhance at least one sound signal prior to presenting the sound signal as audio content to the user. In some embodiments, the captured sounds may include a leakage signal emitted by a transducer (e.g., an interior transducer 275) of the in-ear devices 270 or by one or more transducers in the transducer array 220.

In some embodiments, the transducer array 220 provides one or more sound signals to the user. The transducer array 220 includes a plurality of transducers. A transducer may be, e.g., a speaker (e.g., the speaker 160), a tissue transducer (e.g., the tissue transducer 170), some other device that presents the sound signals to the user, or some combination thereof. A tissue transducer may be configured to function as a bone conduction transducer or a cartilage conduction transducer. The transducer array 220 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 220 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of the headset and may be configured to be behind the auricle coupled to a portion of the user's skull. The bone conduction transducer receives vibration instructions from the audio controller 230 and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of the headset and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

In some embodiments, the transducer array 220 may present an augmented sound signal as audio content to the user in accordance with instructions provided by the audio controller 230. In these embodiments where audio content is solely being provided by the transducer array 220 of the headset, the transducer array may include one or more dipole speaker assemblies to mitigate the leakage signal. The dipole speaker assembly structure and operation are further described in, e.g., U.S. patent application Ser. No. 16/737, 316, filed Jan. 8, 2020, U.S. patent application Ser. No. 16/555,058, filed Aug. 29, 2019, and U.S. patent application Ser. No. 16/790,613, filed Feb. 13, 2020, the contents of which are hereby incorporated by reference in their entirety. In other embodiments, the transducer array 220 may receive instructions from the audio controller 230 to output a mitigation signal. In these embodiments, the audio content is solely being provided by the in-ear devices 270.

In some embodiments, the in-ear devices 270 may present the augmented sound signal as audio content to the user in accordance with instructions provided by the audio controller 230. The in-ear devices 270 may be embodiments of the in-ear devices 185 in FIG. 1A or FIG. 1B. Each in-ear device 270 includes at least a communication unit 273 and an interior transducer 275. In some embodiments, one or more in-ear devices 270 may include a battery, an exterior transducer, an in-ear audio controller, an exterior microphone, an interior microphone, some other components not discussed here, or some combination thereof. In some embodiments, one or more of the in-ear devices 270 may be, e.g., earbuds that are communicatively coupled to the audio system 200. The communication unit 273 includes a receiver, and in some embodiments may also include a transmitter. In some embodiments, the communication unit 273 may provide sounds captured by the exterior microphone and/or interior microphone to the audio controller 230. The communication unit 273 may receive instructions from the audio controller 230. The instructions may include one or more filters to apply to the sound signal emitted by the target sound source and/or the augmented sound signal. In some embodiments, the in-ear audio controller may apply the one or more filters to the sound signal to generate the augmented sound signal. The interior transducer 275 presents the augmented sound signal to the user. Each in-ear device 270 is configured to be fit within the ear canal of the user so that it at least partially occludes the ear canal.

During the presentations of the augmented sound signal to the user, the in-ear devices 270 may emit a leakage signal. The leakage signal may be heard by other persons and/or captured by other devices (e.g., headsets) in the local area inhibiting the privacy of the user. In some embodiments, the leakage signal may be monitored by the microphone array 210 and substantially mitigated in the far field by a mitigation signal output by the transducer array 220. This is discussed in further detail in FIG. 1A.

The audio controller 230 controls operation of the audio system 200. In the embodiment of FIG. 2, the audio controller 230 includes a data store 235, a calibration module 237, a DOA estimation module 240, a transfer function module 245, a tracking module 250, a source identification module 255, a sound filter module 260, and a communication module 265. The audio controller 230 may be located inside a headset, in some embodiments. Some embodiments of the audio controller 230 have different components than those described here. Similarly, functions can be distributed among the components in different manners than described here. For example, some functions of the audio controller 230 may be performed external to the headset.

The data store 235 stores data for use by the audio system 200. Data in the data store 235 may include sounds recorded in the local area of the audio system 200, direction of arrival (DOA) estimates, sound source locations, a target sound source, head-related transfer functions (HRTFs), transfer functions for one or more sensors, array transfer functions (ATFs) for one or more of the acoustic sensors, a model of the local area, user input, one or more audiograms of the user, speech-in-noise test results for the user, spectro-temporal discrimination results for the user, a sound profile of the user, sound filters, sound signals, other data relevant for use by the audio system 200, or any combination thereof.

The model of the local area tracks the positions, movements, and acoustics of each sound source (including the user) in the local area and stores acoustic parameters that describe the local area. The model of the local area may include positional information about the user (e.g., a location, an orientation, and/or a velocity of the user in the local area), movement information about the user (e.g., eye tracking information about the user and/or gestures performed by the user), and acoustic information about the user (e.g., one or more filters for enhancing or suppressing a sound emitted by the user). The model of the local area may also include positional information about the sound sources (e.g., a location of each sound source in the local area), type information about some or all of the sound sources (e.g., a sound source is a person, a sound source is a virtual object, etc.), and The model of the local area may also include acoustic parameters (e.g., reverberation time) that describe the local area. In some embodiments, the audio system updates the model of the local area with updated information about the user and/or updated information about the sound sources and/or updated information about the local area over time.

The calibration module 237 generates a sound profile of the user. The sound profile is personalized sound information about the user describing how well a user hears sounds at different frequencies. The sound profile may include information from one or more audiograms, loudness discomfort levels test results, speech-in-noise test results, spectro-temporal discrimination results, temporal fine-structure test results, cognitive performance test results, self-reported hearing abilities, some other hearing test result, or some combination thereof. In some embodiments, the sound profile may include information from one or more EEG test results, pupillometry, heart activity parameters of the user or some other biosignal test result of the user. In some embodiments, the calibration module 237 generates the sound profile by presenting audio content to the user via the transducer array 220 and/or the in-ear devices 270. The audio content is presented at different frequencies (e.g., using pure tones) and the user provides feedback regarding if/when they hear the audio content. In some embodiments, the audio content is presented using more complex spectrotemporally varying signals. In some embodiments, the feedback may be provided by the user via an I/O interface communicatively coupled to the audio system 200. In other embodiments, the user may perform a gesture (e.g., a thumbs up) captured by a PCA of the headset that signifies if/when they hear the audio content. In some embodiments, the user may provide a verbal cue as feedback that is captured by the microphone array 210. In some embodiments, the calibration module 237 collects the sound profile from the user and/or from an audiologist via the I/O interface or via some other external system communicatively coupled to the audio system 200.

The calibration module 237 may update the sound profile of the user as needed over time. For example, during operation of the audio system 200, the calibration module may receive feedback from the user related to the performance of the headset and/or the in-ear devices 270. The user feedback may include feedback (e.g., a gesture or a verbal cue) related to the presented audio content. Based on the received feedback, the calibration module 237 may update the sound profile of the user accordingly. In some embodiments, the user feedback may be less overt. For example, the user may have a tendency to turn up the volume when the audio content being presented is in a particular frequency band (e.g., at a higher frequency). Over time, the calibration module 237 may identify this pattern and adjust the sound profile to reflect hearing loss in the particular frequency band. In another example, the user may move their head and/or eyes more frequently when the audio content being presented is in a particular frequency band. Over time, the calibration module 237 may identify this pattern and adjust the sound profile to reflect hearing loss in the particular frequency band. The updated sound profile could then be used to generate filters which account for the hearing loss in the particular frequency band.

The DOA estimation module 240 is configured to localize sound sources in the local area based in part on captured sound from the microphone array 210. Localization is a process of determining where sound sources are located relative to the user of the audio system 200. The DOA estimation module 240 performs a DOA analysis to localize one or more sound sources within the local area and update the model of the local area accordingly. The DOA analysis may include analyzing the intensity, spectra, and/or arrival time of each sound at the microphone array 210 to determine the direction from which the sounds originated. In some cases, the DOA analysis may include any suitable algorithm for analyzing a surrounding acoustic environment in which the audio system 200 is located.

For example, the DOA analysis may be designed to receive input signals from the microphone array 210 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the microphone array 210 received the direct-path audio signal. The determined angle may then be used to identify the DOA for the received input signal. Other algorithms not listed above may also be used alone or in combination with the above algorithms to determine DOA.

The transfer function module 245 is configured to generate one or more acoustic transfer functions. Generally, a transfer function is a mathematical function giving a corresponding output value for each possible input value. Based on parameters of the detected sounds, the transfer function module 245 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone (e.g. a microphone of the microphone array 210 and/or an exterior microphone of the in-ear devices 270) receives a sound from a point in space.

An ATF includes a number of transfer functions that characterize a relationship between the sound sources and the corresponding sound received by the acoustic sensors in the microphone array 210. Accordingly, for a sound source there is a corresponding transfer function for each of the acoustic sensors in the microphone array 210. And collectively the set of transfer functions is referred to as an ATF. Accordingly, for each sound source there is a corresponding ATF. The ATF for a particular sound source location relative to the microphone array 210 may differ from user to user due to a person's anatomy (e.g., ear shape, shoulders, etc.) that affects the sound as it travels to the person's ears. Accordingly, the ATFs of the microphone array 210 are personalized for each user of the audio system 200.

In some embodiments, the transfer function module 245 determines one or more HRTFs for a user of the audio system 200. The HRTF characterizes how an ear receives a sound from a point in space. The HRTF for a particular sound source location relative to a person is unique to each ear of the person (and is unique to the person) due to the person's anatomy (e.g., ear shape, shoulders, etc.) that affects the sound as it travels to the person's ears. In some embodiments, the transfer function module 245 may determine HRTFs for the user using a calibration process. In some embodiments, the transfer function module 245 may provide information about the user to a remote system. The remote system determines a set of HRTFs that are customized to the user using, e.g., machine learning, and provides the customized set of HRTFs to the audio system 200.

The tracking module 250 is configured to track locations of one or more sound sources. The tracking module 250 may compare current DOA estimates and compare them with a stored history of previous DOA estimates. In some embodiments, the audio system 200 may recalculate DOA estimates on a periodic schedule, such as once per second, or once per millisecond. The tracking module 250 may compare the current DOA estimates with previous DOA estimates, and in response to a change in a DOA estimate for a sound source, the tracking module 250 may determine that the sound source moved. In some embodiments, the tracking module 250 may detect a change in location based on visual information received from the headset (e.g., from a DCA and/or a PCA) or some other external source. The tracking module 250 may track the movement of one or more sound sources over time. The tracking module 250 may store values for a number of sound sources and a location of each sound source at each point in time in the model of the local area. In response to a change in a value of the number or locations of the sound sources, the tracking module 250 may determine that a sound source moved, and the model of the local area is updated accordingly. The tracking module 250 may calculate an estimate of the localization variance. The localization variance may be used as a confidence level for each determination of a change in movement.

The source identification module 255 is configured to determine a sound source (e.g., a target sound source) of the plurality of sound sources in the local area that is of interest to the user at any given time. The target sound source may be a real-world sound source or a virtual sound source. In one embodiment, the source identification module 255 determines the target sound source based in part on implicit user input stored in the model of the local area and/or express user input provided directly by the user. For example, the model of the local area includes positional information about the user, positional information about the sound sources, and eye tracking information for the user. Based on the mapped gaze vector (i.e., an implicit user input), the source identification module 255 determines the target sound source is the sound source the user is looking at. In some embodiments, the gaze of the user is tracked over time in the model of the local area and the target sound source is the sound source the user is looking at for a threshold amount of time (e.g., for 3 seconds, for 5 seconds, etc.). In another example, the model of the local area includes gesture information (i.e., implicit user input) about the user. Based on an identified gesture (e.g., pointing a finger at) performed by the user, the source identification module 255 determines the target sound source is the sound source being pointed at by the user. In some embodiments, the source identification module 255 determines the target sound source based on express user input. For example, the user may provide a verbal cue (e.g., saying which sound source should be the target sound source) captured by the microphone array. Based on this user input, the source identification module 255 determines the target sound source is the sound source indicated by the user.

The sound filter module 260 determines one or more filters to apply to one or more sound signals. The sound signals may correspond to sound emitted by the target sound source and/or sound emitted by other sound sources (e.g., leakage sound emitted by the in-ear devices 270). In some embodiments, the one or more sound filters may cause the sound signal associated with the target sound source to be enhanced. In some embodiments, the sound filter module 260 determines one or more sound filters that filter out (i.e., decrease or eliminate) sounds associated with the other sound sources in the local area. In some embodiments, the sound filter module 260 may determine the sound signal emitted by the target sound source may need to be spatialized with a filter (e.g., one or more HRTFs determined by the transfer function module 245). In some embodiments, the sound filter module 260 may determine one or more filters (e.g., a multiband limiter) to prevent discomfort associated with high sound pressure levels at particular frequencies. In some embodiments, the sound filter module 260 may identify one or more filters to suppress feedback. For example, a frequency transposition filter may be identified that transposes all or certain frequency bands by a particular amount (e.g., by 5 Hz, 20 Hz, 50 Hz, etc.)

The sound filter module 260 may determine one or more filters based on the sound profile of the user. For example, the sound filter module 260 may select a filter that amplifies certain frequencies based on the sound profile of the user which included information about certain frequencies the user has trouble hearing. In another example, the sound filter module 260 may select a wide dynamic range compression filter from a plurality of wide dynamic range compression filters based on the sound profile of the user which included information about how intense a sound needs to be for the user to hear it. The wide dynamic range compression filter applies a non-linear gain to the sound signal. For example, the wide dynamic range compression filter may amplify soft sounds (i.e., low intensity sounds) by a large amount, medium sounds (i.e., mid-range intensity sounds) by a moderate amount, and loud sounds (i.e., high intensity sounds) by a small amount. In another example, the wide dynamic range compression filter may amplify the sound signal based on frequency in an to equalize the sound presented to the user. Each unique sound signal may have its own unique wide dynamic range compression filter. The sound filter module 260 determines which is the appropriate wide dynamic range compression filter to apply to the sound signal associated with the target sound source.

In some embodiments, the sound filter module 260 generates the filters based on the model of the local area. The model of the local area may include types of sound sources in the local area. For example, at least a sound source in the local area (i.e., not the target sound source) may be a mechanical device. The sound filter module 260 may determine a sound filter to decrease or eliminate the frequency of sound emitted by the mechanical device. The model of the local area may include acoustic parameters that describe acoustic properties of the local area. The acoustic parameters may include, e.g., a reverberation time, a reverberation level, a room impulse response, etc. In some embodiments, the sound filter module 260 calculates one or more of the acoustic parameters and stores the parameters in the model of the local area. In some embodiments, the sound filter module 260 requests the acoustic parameters from a mapping server (e.g., as described below with regard to FIG. 5) and stores the parameters in the model of the local area. The sound filter module 260 may determine one or more sound filters that decrease or eliminate the frequencies of sound emitted by other sound sources (i.e., not sound emitted by the target sound source) based on a high reverberation time of the local area.

The sound filter module 260 may detect that the identified target source is within a threshold distance of a different sound source in the local area. For example, the sound filter module 260 may utilize the one or more determined sound source locations and the model of the local area to determine if the identified target source is within the threshold distance of a different sound source. The threshold distance may be unique for each sound source. For example, the threshold distance for a sound source may be based on, e.g., frequencies of the sound emitted by the sound source, based on the intensities of the sound emitted by the sound source, and based on the sound profile of the user, or some combination thereof. For example, certain frequencies and/or certain intensities may need to be spaced further apart for the user to hear them. The sound filter module 260 updates at least one of the one or more filters (e.g., by updating an HRTF) to increase spatial separation between the target sound source and the different sound source to be at least a separation distance that is greater than the threshold distance. In this embodiment, the augmented sound signal is such that sound appears to originate from the target sound source and the sound from the different sound source appears to originate from a location in the local area that is at least the separation distance from the target sound source. This embodiment is described in further detail in FIG. 3.

The sound filter module 260 may apply the one or more filters to the sound signal to generate the augmented sound signal. In some embodiments, the augmented sound signal may be provided to the transducer array 320 for presentation to the user. In other embodiments, the augmented sound signal may be provided to the communication module 270. In some embodiments, the in-ear devices 270 apply the one or more filters to the sound signal.

The communication module 265 communicates with one or more external systems communicatively coupled to the audio system 200. The communication module 265 may include a receiver (e.g., an antennae) and a transmitter. The external systems may include, e.g., some other component of the headset, an artificial reality console, an I/O interface, a mapping server, the in-ear devices 270, etc. The communication module 265 may send and receive data related to the model of the local area with the mapping server. The communication module 265 may send data (e.g., one or more filters, the augmented sound signal) and receive data (e.g., captured sound) with the communication unit 273 of the in-ear devices 270. The communication module 265 may receive data (e.g., the sound profile of the user, user feedback) from an external system (e.g., the I/O interface).

The processing and computations performed by the audio controller 230 allows for better enhancement to audio content presented to the user. For example, a user suffering from hearing loss benefits from the audio controller 230 identifying a target sounds source that emits sound in a frequency the user has difficulty hearing and generating one or more filters to apply to sound emitted by the target sound source that enhance (amplify) those particular frequencies of sound. The sound sources located in the local area are better tracked by the microphone array 210 of the headset which allows for better identification of the target sound source. Also, the processing and computations performed by the audio controller 230 allows the in-ear devices 270 to present more individualized and enhanced audio content to the user.

Figure 3:
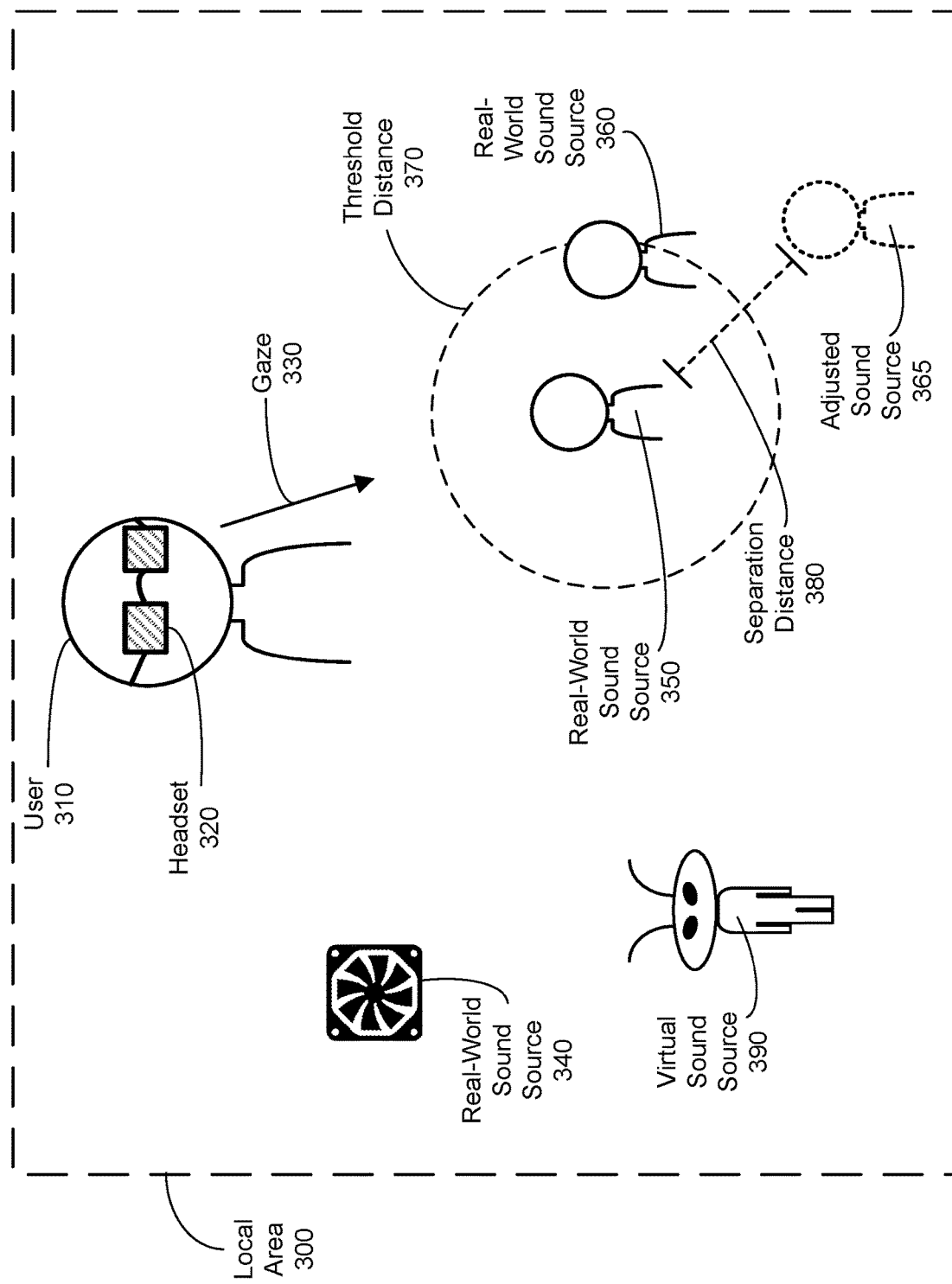
FIG. 3 is an example of a local area including one or more sound sources, in accordance with one or more embodiments.

FIG. 3 is an example of a local area 300 including one or more sound sources, in accordance with one or more embodiments. The local area 300 includes a user 310 wearing a headset 320 in proximity to a plurality of sound sources (e.g., a real-world sound source 340, a real-world sound source 350, a real-world sound source 360, and a virtual sound source 390). The real-world sound source 340 is depicted as a mechanical device, the real-world sound source 350 is depicted as a person, the real-world sound source 360 is depicted as another person, and the virtual sound source 390 is depicted as an extraterrestrial. In some embodiments, the headset 320 may be the headset 100 of FIG. 1A or the headset 105 of FIG. 1B. In one embodiment, the user 310 may also wear an in-ear device (not shown) that may be an embodiment of the in-ear devices 185 of FIG. 1A and FIG. 1B. The plurality of sound sources may collectively produce sound that may be incoherent when listened to all at once for a user 310 with some amount of hearing loss. In some embodiments, the sound produced by real-world sound source 350 may be indistinguishable from the sound produced by real-world sound source 360 to the user 310 (with or without hearing loss). The audio system may generate one or more filters to apply to the sound emitted by any or all of the sound sources 340, 350, 360, 390 to enhance the audio content presented to the user 310.

An audio system (e.g., the audio system 200) of the headset 320 identifies a target sound source (e.g., sound source 350) based on a model of the local area 300 or based on user input as described above with reference to FIG. 2. In the illustrated embodiment of FIG. 3, the audio system may determine the target sound source based on implicit feedback provided by the user (e.g., based on the gaze vector 330) included in the model of the local area 300. The gaze vector 330 is determined to be directed towards the position of the real-world sound source 350, and the audio system identifies the real-world sound source 350 to be the target sound source. The audio system of the headset 320 determines one or more filters that may be applied to the audio content presented by the headset 320 and/or presented by in-ear devices (not shown) worn by the user 310. The audio system determines the filters based on a sound profile of the user 310, the model of the local area 300, or both.

The audio system may update at least one of the one or more filters to provide better spatialization of the sound emitted by the target sound source. In the illustrated embodiment, a threshold distance 370 is depicted. The threshold distance 370 is a predetermined spherical distance measured from a center of the real-world sound source 350 (i.e., the target sound source in this example) outward. The threshold distance 370 may be dependent upon, e.g., the frequency of the sound emitted by the real-world sound source 350, the amplitude of the sound emitted by the real-world sound source 350, a sound profile of the user 310, or some combination thereof. The audio system may detect that the real-world sound source 360 is within the threshold distance 370 of the target sound source (i.e., the real-world sound source 350). The audio system updates at least one of the one or more filters (e.g., by updating an HRTF) to increase spatial separation between the target sound source and the real-world sound source 360 to be a separation distance 380 that is at least greater than the threshold distance 370. In some embodiments, the updated filter may be applied to the sound signal associated with the target sound source by the audio system. In other embodiments, the updated filter may be applied to the sound signal associated with the target sound source by the in-ear devices. The augmented sound signal (i.e., the sound signal after filter application) is such that sound appears to originate from the target sound source and the sound from the real-world sound source 360 appears to originate from a location in the local area corresponding to the adjusted sound source 365. The user 310 may now be able to distinguish between the two real-world sound sources 350, 360 and in some embodiments may hear the real-world sound source 350 more easily.

Figure 4:
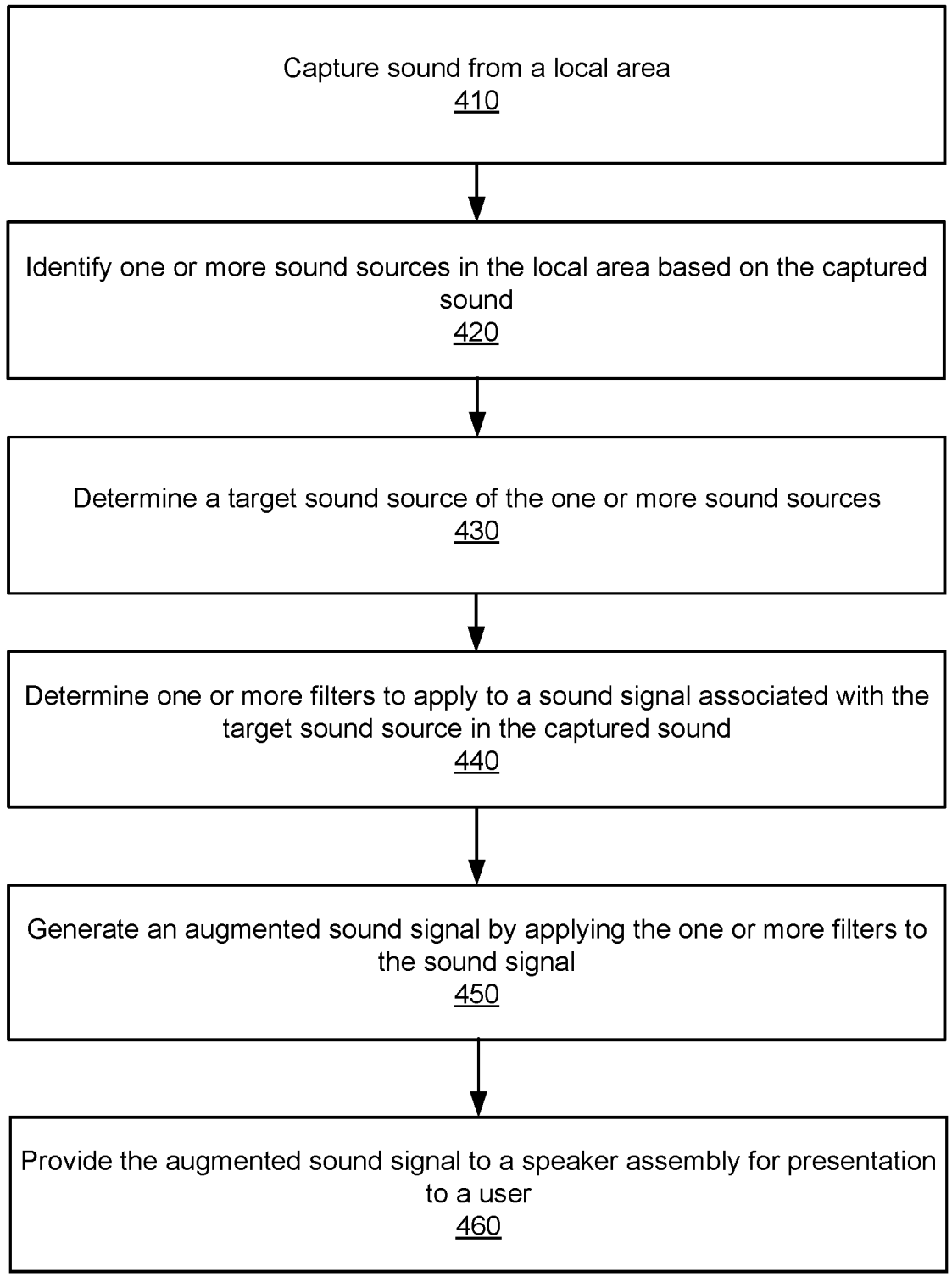
FIG. 4 is a flowchart illustrating a process for augmenting a sound signal for presentation to a user, in accordance with one or more embodiments.

FIG. 4 is a flowchart illustrating a process 400 for augmenting a sound signal for presentation to a user, in accordance with one or more embodiments. The process shown in FIG. 4 may be performed by components of an audio system (e.g., audio system 200). Other entities may perform some or all of the steps in FIG. 4 in other embodiments. Embodiments may include different and/or additional steps or perform the steps in different orders.

The audio system captures 410 sound from a local area. In one embodiment, the audio system captures sound using one or more microphones coupled to a frame of a headset worn by a user.

The audio system identifies 420 one or more sound sources in the local area based on the captured sound. The captured sound collected by the microphones and captured images collected by a DCA and/or PCA of a headset may be combined to determine a model of the local area. The model of the local area depicts the position of the one or more sound sources.

The audio system determines 430 a target sound source of the one or more sound sources. In some embodiments, the audio system determines the target sound source based on implicit user input stored in the model of the local area and/or express user input provided directly by the user. For example, the model of the local area may include a mapped gaze vector (i.e., an implicit user input) that is utilized by the audio system in the determination of the target sound source. The mapped gave vector may have been determined by an eye tracking system of the headset. In some embodiments, the audio system may utilize an express user input (e.g., a verbal cue from the user specifying the target sound source). The verbal cue may be captured by the microphones.

The audio system determines 440 one or more filters to apply to a sound signal associated with the target sound source. In some embodiments, the audio system determines the one or more filters based on a sound profile of the user. The sound profile is personalized sound information about the user describing how well a user hears sounds at different frequencies. The sound profile may be stored in the audio system. Based on the sound profile, the audio system may determine to apply a filter that enhances the sound signal associated with the target sound source. In some embodiments, the audio system may determine to apply a filter that better spatializes the sound signal associated with the target sound source based on the model of the local area. In some embodiments, the audio system may determine one or more filters to apply to other sound associated with other sound sources located in the local area.

The audio system generates 450 an augmented sound signal by applying the one or more filters to the sound signal. In one embodiment, the augmented sound signal is such that sound appearing to originate from the target sound source is distinguishable from sound emitted by other sound sources in the local. For example, the augmented sound signal is such that sound appears to originate from the target sound source and the sound from a different sound source appears to originate from a location in the local area that is at least a separation distance from the target sound source The audio system provides 460 the augmented sound signal to a speaker assembly for presentation to a user. In one embodiment, the augmented sound signal is provided to a speaker assembly of an in-ear device worn by the user. In another embodiment, the augmented sound signal is provided to a speaker assembly of the headset.

In some embodiments, the audio system provides the one or more filters to in-ear devices. The in-ear devices generate the augmented sound signal by applying the one or more filters to the sound signal.

The processing and computations performed by the audio system (e.g., the identification of the target sound source, the generation of one or more filters to apply to sound emitted by the target sound source, etc.) allows for better enhancement to audio content presented to the user. For example, a user suffering from hearing loss benefits from the audio controller 230 identifying a target sounds source that emits sound in a frequency the user has difficulty hearing and generating one or more filters to apply to sound emitted by the target sound source that enhance (amplify) those particular frequencies of sound. The sound sources located in the local area are better tracked by the microphone array 210 of the headset which allows for better identification of the target sound source. Also, the processing and computations performed by the audio system allows the in-ear devices to present more individualized and enhanced audio content to the user when compared to current hearing aid devices.

Figure 5:
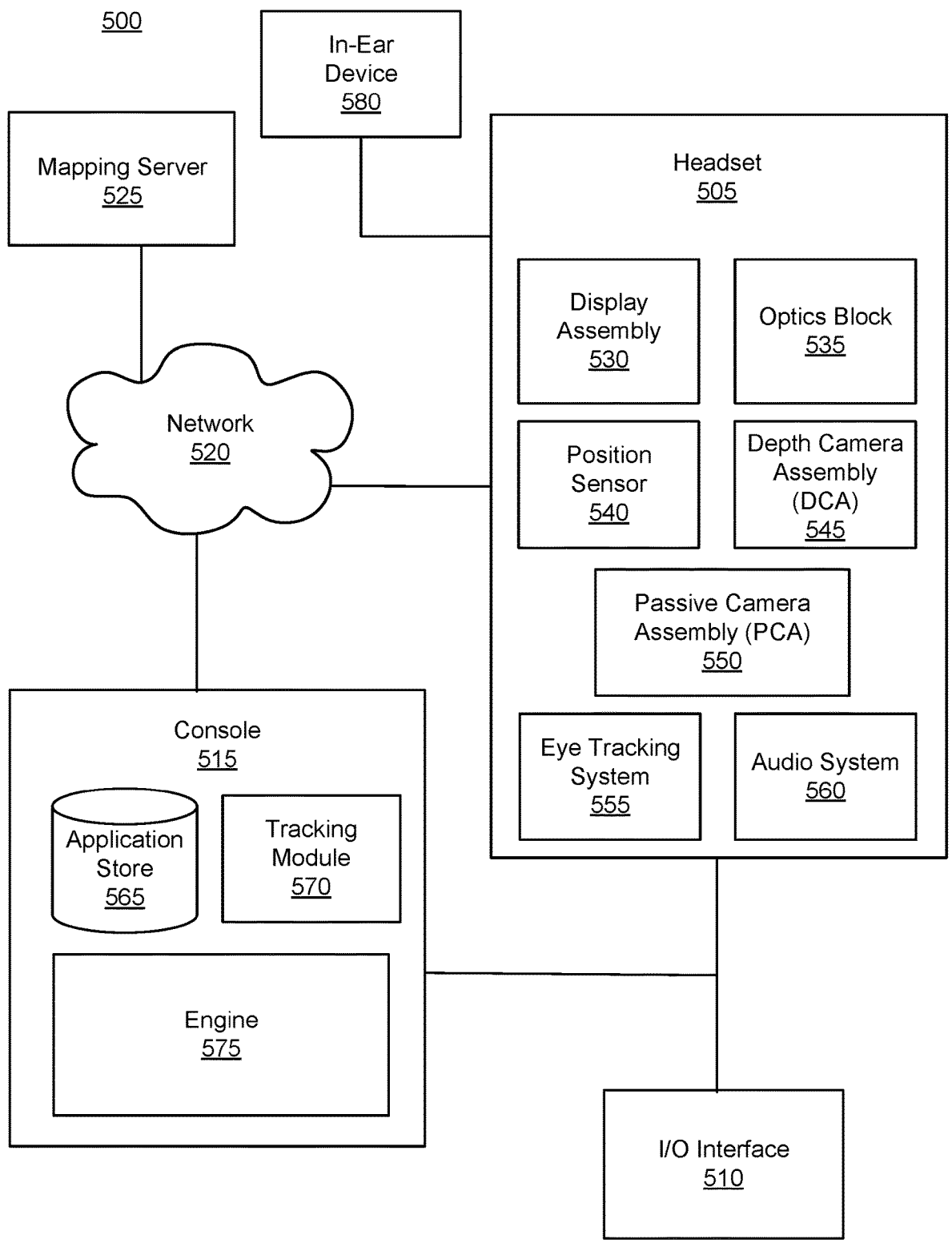
FIG. 5 is a system that includes a headset and one or more in-ear devices, in accordance with one or more embodiments.

FIG. 5 is a system 500 that includes a headset 505 and one or more in-ear devices 580, in accordance with one or more embodiments. In some embodiments, the headset 505 may be the headset 100 of FIG. 1A or the headset 105 of FIG. 1B. The system 500 may operate in an artificial reality environment. The system 500 shown by FIG. 5 includes the headset 505, an input/output (I/O) interface 510 that is coupled to a console 515, a network 520, a mapping server 525, and the in-ear device 580. While FIG. 5 shows an example system 500 including one headset 505, one I/O interface 510, and one in-ear device 580, in other embodiments any number of these components may be included in the system 500. For example, there may be two in-ear devices communicating with an associated headset. In another example, there may be multiple headsets each having an associated I/O interface 510, with each headset and I/O interface 510 communicating with the console 515. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 515 may be provided by the headset 505.

The headset 505 includes a display assembly 530, an optics block 535, one or more position sensors 540, a DCA 545, a PCA 550, an eye tracking system 555, and an audio system 560. Some embodiments of headset 505 have different components than those described in conjunction with FIG. 5. Additionally, the functionality provided by various components described in conjunction with FIG. 5 may be differently distributed among the components of the headset 505 in other embodiments or be captured in separate assemblies remote from the headset 505.

The display assembly 530 displays content to the user in accordance with data received from the console 515. The display assembly 530 displays the content using one or more display elements (e.g., the display elements 120). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element may also include some or all of the functionality of the optics block 535.

The optics block 535 may magnify image light received from the electronic display, corrects optical errors associated with the image light, and presents the corrected image light to one or both eyeboxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The position sensor 540 is an electronic device that generates data indicating positional information about the headset 505. The position sensor 540 may generate one or more measurement signals in response to motion of the headset 505. The position sensor 540 is an embodiment of the position sensor 190. Examples of a position sensor 540 include: one or more IMUs, one or more accelerometers, one or more gyroscopes, one or more magnetometers, another suitable type of sensor that detects motion, or some combination thereof. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 505 from the sampled data. For example, the IMU integrates the measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, however, in practice the reference point is defined as a point within the headset 505. Further operation of the position sensor 540 is described above with regard to FIG. 1A.

The DCA 545 generates depth information for a portion of the local area. The DCA includes one or more imaging devices and a DCA controller. The DCA 545 may also include an illuminator. Operation and structure of the DCA 545 is described above with regard to FIG. 1A.

The PCA 550 generates color image data for the local area. The PCA may include one or more imaging devices that capture images of some or all of the local area. In some embodiments, the PCA 550 may capture images of one or more sound sources (including the user) in the local area. Further description about the operation and structure of the PCA 550 is described above with regard to FIG. 1A.

The eye tracking system 555 determines eye tracking information associated with an eye of the user wearing the headset 505. The eye tracking information determined by the eye tracking system 555 may include, e.g., gaze information. In some embodiments, the eye tracking system 555 determines pupillometry information such as pupil size and reactivity. The gaze information and/or the pupillometry information may be used to determine where a user is looking. The eye tracking system 555 may utilize one or more imaging devices to track the eye(s) of the user. Further operation of the eye tracking system is described above with regard to FIG. 1A.

The audio system 560 generates one or more filters to apply to sound signals. The audio system 560 is substantially the same as the audio system 200 described above. The audio system 560 may comprise one or more microphones, one or more transducers, and an audio controller. In some embodiments, the audio system may identify a target sound source in the local area based on implicit user feedback stored in a model of the local area and/or explicit user feedback. In some embodiments, the audio system generates the one or more filters to apply to a sound signal associated with a target sound source. In some embodiments, the audio system generates the one or more filters to apply to sound signal associated with other sound sources in the local area.

The I/O interface 510 is a device that allows a user to provide information, send action requests to the console 515, and receive responses from the console 515. The user may provide information (e.g., a sound profile of the user) to be stored in the audio system 560. An action request is a request to perform a particular action. For example, an action request may be an instruction to start or end capture of image or video data, or an instruction to perform a particular action within an application. The I/O interface 510 may include one or more input devices. Example input devices include: a keyboard, a mouse, a game controller, or any other suitable device for receiving action requests and communicating the action requests to the console 515. An action request received by the I/O interface 510 is communicated to the console 515, which performs an action corresponding to the action request. In some embodiments, the I/O interface 510 includes an IMU that captures calibration data indicating an estimated position of the I/O interface 510 relative to an initial position of the I/O interface 510. In some embodiments, the I/O interface 510 may provide haptic feedback to the user in accordance with instructions received from the console 515. For example, haptic feedback is provided when an action request is received, or the console 515 communicates instructions to the I/O interface 510 causing the I/O interface 510 to generate haptic feedback when the console 515 performs an action.

The console 515 provides content to the headset 505 for processing in accordance with information received from one or more of: the DCA 545, the headset 505, and the I/O interface 510. In the example shown in FIG. 5, the console 515 includes an application store 565, a tracking module 570, and an engine 575. Some embodiments of the console 515 have different modules or components than those described in conjunction with FIG. 5. Similarly, the functions further described below may be distributed among components of the console 515 in a different manner than described in conjunction with FIG. 5. In some embodiments, the functionality discussed herein with respect to the console 515 may be implemented in the headset 505, or a remote system.

The application store 565 stores one or more applications for execution by the console 515. An application is a group of instructions, that when executed by a processor, generates content for presentation to the user. Content generated by an application may be in response to inputs received from the user via movement of the headset 505 or the I/O interface 510. Examples of applications include: gaming applications, conferencing applications, video playback applications, or other suitable applications.

The tracking module 570 tracks movements of the headset 505 using information from the one or more position sensors 540. For example, the tracking module 570 determines a position of a reference point of the headset 505 in a mapping of a local area based on information from the headset 505. Additionally, in some embodiments, the tracking module 570 may use portions of data indicating a position of the headset 505 from the position sensor 540 as well as representations of the local area from the DCA 545 to predict a future location of the headset 505. The tracking module 570 provides the estimated or predicted future position of the headset 505 to the engine 575.

The engine 575 executes applications and receives position information, acceleration information, velocity information, predicted future positions, or some combination thereof, of the headset 505 from the tracking module 570. Based on the received information, the engine 575 determines content to provide to the headset 505 for presentation to the user. For example, if the received information indicates that the user has looked to the left, the engine 575 generates content for the headset 505 that mirrors the user's movement in a virtual local area or in a local area augmenting the local area with additional content. Additionally, the engine 575 performs an action within an application executing on the console 515 in response to an action request received from the I/O interface 510 and provides feedback to the user that the action was performed. The provided feedback may be visual or audible feedback via the headset 505 or haptic feedback via the I/O interface 510.

The network 520 couples the headset 505 and/or the console 515 to the mapping server 525. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 525 may include a database that stores a model describing a plurality of spaces, wherein one location in the model corresponds to a current configuration of a local area of the headset 505. The mapping server 525 receives, from the headset 505 via the network 520, information describing at least a portion of the local area and/or location information for the local area. The mapping server 525 determines, based on the received information and/or location information, a location in the model that is associated with the local area of the headset 505. The mapping server 525 determines (e.g., retrieves) one or more acoustic parameters associated with the local area, based in part on the determined location in the model and any acoustic parameters associated with the determined location. The mapping server 525 may transmit the location of the local area and any values of acoustic parameters associated with the local area to the headset 505.

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    capturing, by one or more microphones, a leakage signal from an in-ear device that is separate from and communicatively coupled to a headset;
    determining a mitigation signal to substantially prevent the leakage signal, the mitigation signal is out-of-phase to the leakage signal; and
    providing, via a speaker assembly coupled to the headset, the mitigation signal as an output signal, wherein the mitigation signal suppresses the leakage signal.

2. The method of claim 1, wherein the in-ear device is presenting audio content that corresponds to the leakage signal.

3. The method of claim 1, wherein the mitigation signal suppresses the leakage signal in a far field.

4. The method of claim 1, further comprising:
    detecting that a target sound source is within a threshold distance of a different sound source in a local area, wherein the mitigation signal suppresses the leakage signal received by the different sound source;
    updating one or more filters to increase spatial separation between the target sound source and the different sound source to be at least a separation distance that is greater than the threshold distance;
    generating an augmented sound signal by applying the one or more filters to a sound signal; and
    providing the augmented sound signal to the speaker assembly for presentation to a user.

5. The method of claim 4, wherein the one or more filters are based in part on one or more of: a location of the user in the local area, a location of each of one or more sound sources in the local area, one or more acoustic parameters of the local area, and types of sound sources in the local area.

6. The method of claim 1, further comprising:
    determining one or more filters to apply to a sound signal associated with a target sound source;
    selecting a wide dynamic range compression filter that corresponds to the target sound source from a plurality of wide dynamic range compression filters, wherein each of the plurality of wide dynamic range compression filters corresponds to a different respective sound sources in a local area;
    generating an augmented sound signal by applying the one or more filters to the sound signal; and
    providing the augmented sound signal to the speaker assembly for presentation to a user.

7. The method of claim 1, further comprising:
    determining a target sound source based in part on a gaze of a user.

8. The method of claim 1, further comprising:
determining a target sound source based in part on a verbal cue provided by a user of the headset.

9. The method of claim 1, further comprising:
capturing an image of a gesture performed by a user of the headset;
determining that the gesture corresponds to a selection of a sound source; and
selecting the sound source as a target sound source.

10. A headset comprising:
one or more microphones coupled to a frame of the headset, the one or more microphones configured to capture sounds from a local area, the captured sounds including a leakage signal from an in-ear device that is separate from and communicatively coupled to the headset;
an audio controller integrated into the headset and communicatively coupled to the in-ear device worn by a user, the audio controller configured to:
determine a mitigation signal to substantially prevent the leakage signal, the mitigation signal is out-of-phase to the leakage signal; and
a speaker assembly configured to provide the mitigation signal as an output signal, wherein the mitigation signal suppresses the leakage signal.

11. The headset of claim 10, wherein the in-ear device is presenting audio content that corresponds to the leakage signal.

12. The headset of claim 10, wherein the mitigation signal suppresses the leakage signal in a far field.

13. The headset of claim 10, wherein the audio controller is further configured to:
detect that a target sound source is within a threshold distance of a different sound source in the local area, wherein the mitigation signal suppresses the leakage signal received by the different sound source;
update one or more filters to increase spatial separation between the target sound source and the different sound source to be at least a separation distance that is greater than the threshold distance;
generate an augmented sound signal by applying the one or more filters to a sound signal; and
provide the augmented sound signal to the speaker assembly for presentation to the user.

14. The headset of claim 13, wherein the one or more filters are based in part on one or more of: a location of the user in the local area, a location of each of one or more sound sources in the local area, one or more acoustic parameters of the local area, and types of sound sources in the local area.

15. The headset of claim 10, wherein the audio controller is further configured to:
determine one or more filters to apply to a sound signal associated with a target sound source;
select a wide dynamic range compression filter that corresponds to the target sound source from a plurality of wide dynamic range compression filters, wherein each of the plurality of wide dynamic range compression filters corresponds to a different respective sound sources in the local area;
generate an augmented sound signal by applying the one or more filters to the sound signal; and
provide the augmented sound signal to the speaker assembly for presentation to the user.

16. A non-transitory computer-readable storage medium comprising stored instructions, the instructions when executed by a processor of a device, cause the device to:
capture, by one or more microphones, a leakage signal from an in-ear device that is separate from and communicatively coupled to a headset;
determine a mitigation signal to substantially prevent the leakage signal, the mitigation signal is out-of-phase to the leakage signal; and
provide, via a speaker assembly coupled to the headset, the mitigation signal as an output signal, wherein the mitigation signal suppresses the leakage signal.

17. The computer-readable storage medium of claim 16, wherein the in-ear device is presenting audio content that corresponds to the leakage signal.

18. The computer-readable storage medium of claim 16, wherein the mitigation signal suppresses the leakage signal in a far field.

* * * * *